United States Patent
Wang et al.

(10) Patent No.: US 10,558,702 B2
(45) Date of Patent: Feb. 11, 2020

(54) UNIFIED STORAGE SYSTEM FOR ONLINE IMAGE SEARCHING AND OFFLINE IMAGE ANALYTICS

(71) Applicant: Baidu USA LLC, Sunnyvale, CA (US)

(72) Inventors: Haojun Wang, San Jose, CA (US); Shaoshan Liu, Fremont, CA (US); James Peng, Fremont, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 465 days.

(21) Appl. No.: 15/092,503

(22) Filed: Apr. 6, 2016

(65) Prior Publication Data

US 2017/0293617 A1    Oct. 12, 2017

(51) Int. Cl.
  *G06F 16/51*    (2019.01)
  *G06F 16/13*    (2019.01)
  *H04L 12/743*   (2013.01)

(52) U.S. Cl.
  CPC ............ *G06F 16/51* (2019.01); *G06F 16/137* (2019.01); *H04L 45/7453* (2013.01)

(58) Field of Classification Search
  CPC ............ G06F 17/30943; G06F 16/137; H04L 45/7453
  See application file for complete search history.

(56) References Cited

U.S. PATENT DOCUMENTS

| | | | |
|---|---|---|---|
| 6,339,767 B1* | 1/2002 | Rivette | G06F 17/30011 707/781 |
| 2002/0099701 A1* | 7/2002 | Rippich | G06F 17/30967 |
| 2004/0068538 A1* | 4/2004 | Lunenfeld | G06Q 30/0601 709/203 |
| 2007/0299804 A1* | 12/2007 | Liu | G06F 17/30545 |
| 2009/0106228 A1* | 4/2009 | Weinman, Jr. | G06Q 30/02 |
| 2010/0287172 A1* | 11/2010 | Schneider | G06F 17/30628 707/759 |
| 2012/0011150 A1* | 1/2012 | Swaminathan | G06F 17/30699 707/770 |
| 2013/0166531 A1* | 6/2013 | Valentin | G06F 17/30392 707/713 |
| 2013/0339314 A1* | 12/2013 | Carpentier | G06F 3/0641 707/692 |

* cited by examiner

*Primary Examiner* — Charles E Lu
(74) *Attorney, Agent, or Firm* — Womble Bond Dickinson (US) LLP

(57) ABSTRACT

According to one embodiment, a master storage node receives a search query for searching images from a client, where the master storage node is coupled to a number of worker storage nodes over a storage network. The master storage node performs a hash operation on one or more keywords of the search query using a first predetermined hash function, generating a first hash value. A first of the worker storage nodes is identified based on the first hash value. The master storage node redirects the search query to the first worker storage node to allow the first worker storage node service the search query. The first worker storage node is to identify one or more images from a first system memory of the first worker storage node based on the search query and to transmit the one or more images to the client.

24 Claims, 9 Drawing Sheets

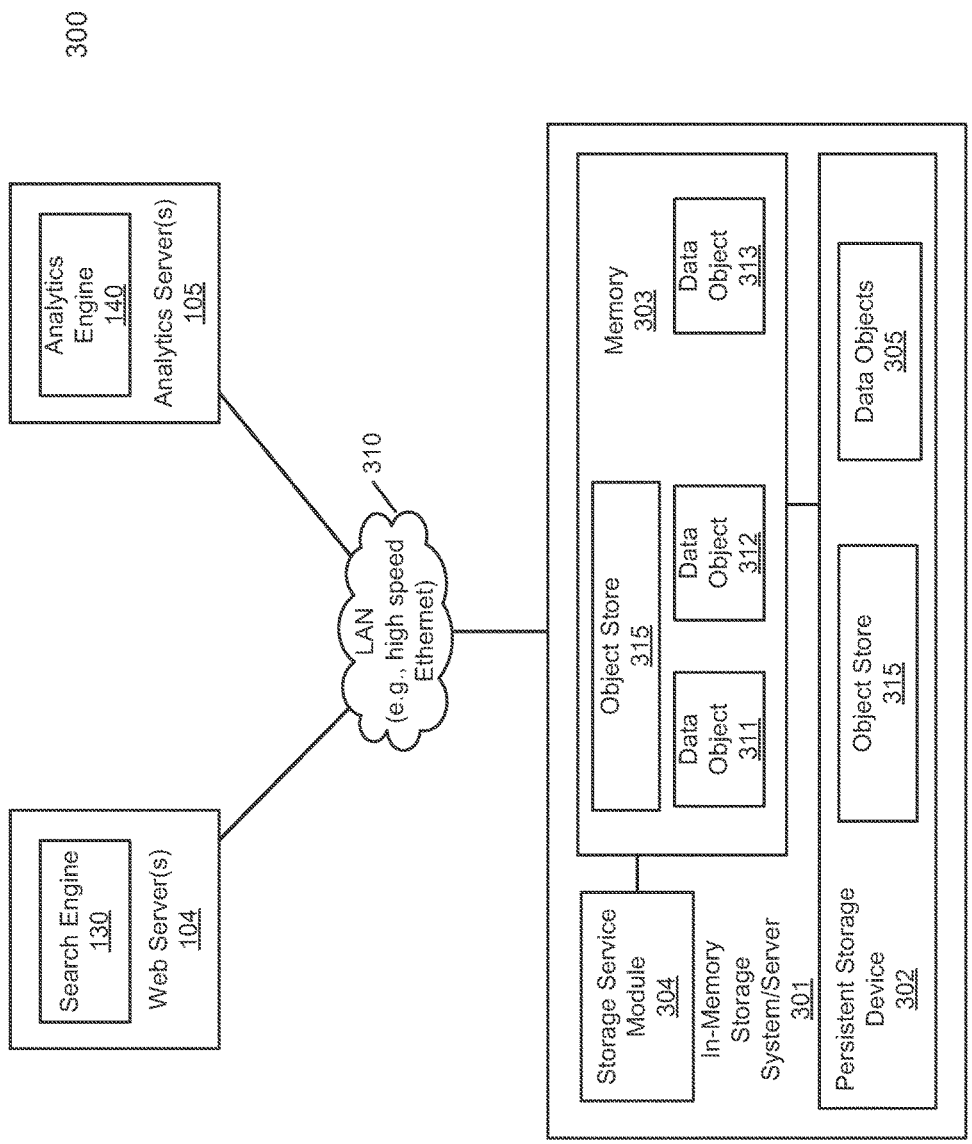

US 10,558,702 B2

UNIFIED STORAGE SYSTEM FOR ONLINE IMAGE SEARCHING AND OFFLINE IMAGE ANALYTICS

FIELD OF THE INVENTION

Embodiments of the present invention relate generally to searching content. More particularly, embodiments of the invention relate to a unified storage system for both online content searching and offline content analytics.

BACKGROUND

Most search engines typically perform searching of Web pages during their operation from a browser running on a client device. A search engine receives a search term entered by a user and retrieves a search result list of Web pages associated with the search term. The search engine displays the search results as a series of subsets of a search list based on certain criteria. General criteria that is used during a search operation is whether the search term appears fully or partly on a given webpage, the number of times the search string appears in the search result, alphabetical order, etc. Further, the user can decide to open a link by clicking on the mouse button to open and browse. Some of the user interactions with the search results and/or user information may be monitored and collected by the search engine to provide better searches subsequently.

Typically, the content provided by a search engine online may also be analyzed by an analytics system offline. FIG. 1 is block diagram illustrating a conventional network configuration for online searching and offline data analytics. Referring to FIG. 1, client devices 101-102 are communicatively coupled to Web server 104 and analytics server 105 over network 103 (e.g., Internet). Web server 104 includes search engine 130 to provide online content searching to clients 101 (e.g., browsing users) in this example based on content 116 stored in content storage system or server 110. The online searching system (e.g., Web server 104 and storage system 110) requires a low latency capability, because the content has to be searched and returned in a very short period of time in response to a search query. Clients 102 (e.g., analytics users) accesses analytics system or server 105 to perform offline data analysis via analytics engine 140 on content 118 stored on analytics system or server 112. The offline analytics system (e.g., analytics server 105 and storage system 112) requires a high throughput capability, because a large amount of data will be accessed. Content 116 and content 118 may be received from data collection system or data sources 150 via ETL (extract, transform, and load) pipelines 121-122, respectively.

In this configuration, the same content has to be loaded in separate storage systems 110 and 112, which may be unnecessarily redundant and require more storage space, as well as difficult to synchronize or manage the data. In addition, data collection system 150 or other data sources have to maintain at least two separate ETL pipelines to feed the data to both storage systems 110 and 112, which requires more network bandwidth and other processing resources.

BRIEF DESCRIPTION OF THE DRAWINGS

Embodiments of the invention are illustrated by way of example and not limitation in the figures of the accompanying drawings in which like references indicate similar elements.

FIGS. 3A-3B are block diagrams illustrating an example of an in-memory storage system according to certain embodiments of the invention.

DETAILED DESCRIPTION

Figure 1:
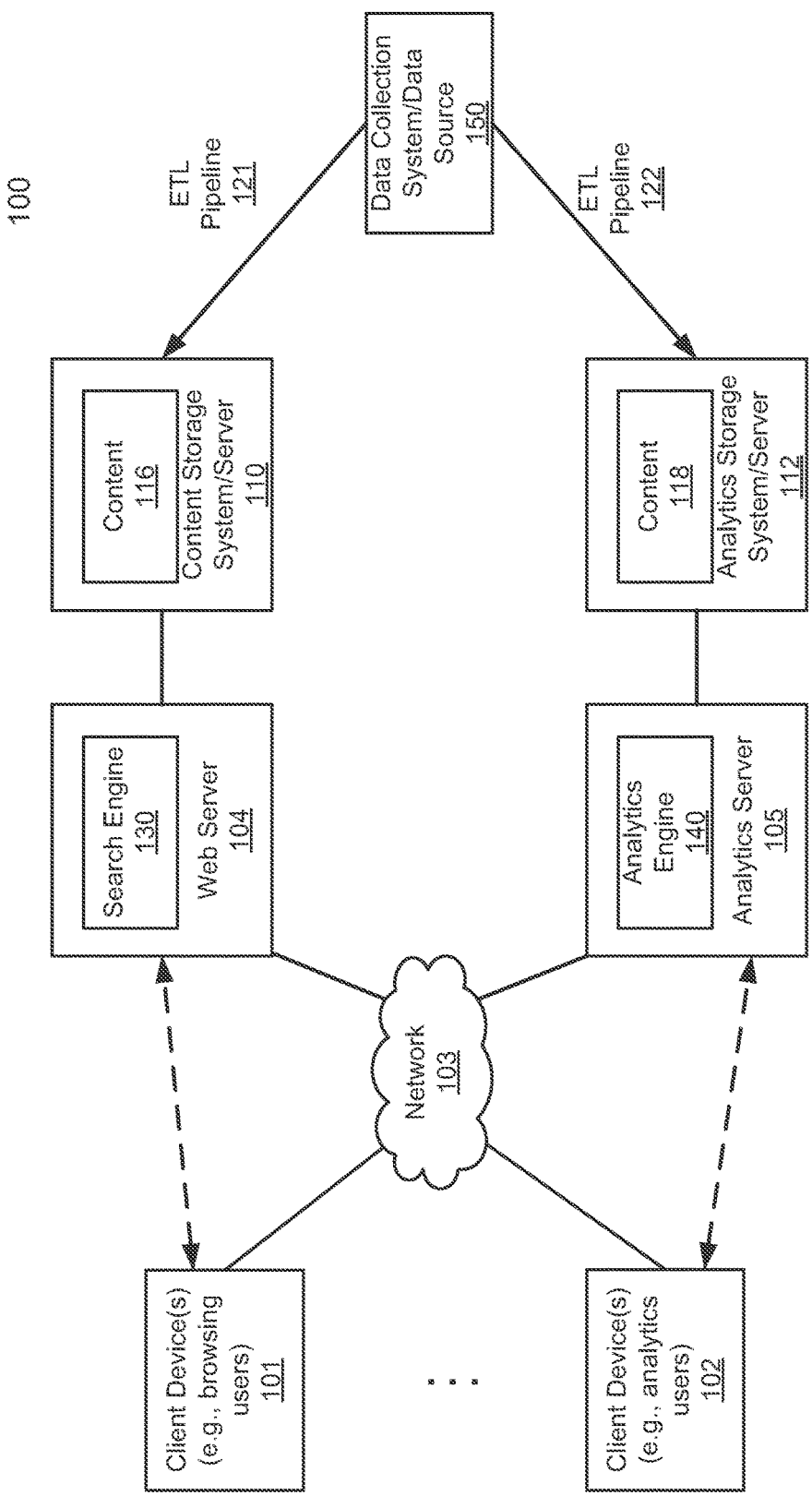
FIG. 1 is block diagram illustrating a conventional network configuration for online searching and offline data analytics.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a single in-memory storage system is utilized to serve content to both Web server(s) for online content searching and analytics server(s) for offline data analytics. The term of "in-memory" refers to a storage configuration in which most or all of the content to be served online and/or offline are loaded and maintained in a system memory (e.g., random access memory or RAM) during the operations of the storage system. Since most or all of the data are maintained in the system memory, the data can be directly retrieved from the system memory to service search requests from both a search engine of the Web server(s) and an analytics engine of the analytics server(s), without having to access a persistent storage device (e.g., hard disks) of the storage system to retrieve the same data. As a result, both requirements of the low latency and high throughput can be satisfied for online content searching and offline data analytics, for example, substantially concurrently. In addition, there is no need to maintain separate storage systems for online content searching and offline data analytics, and the efficiency of data management can be greatly improved. Furthermore, since there is only one single storage system utilized, only one ETL pipeline is needed between a data source and the storage system.

In one embodiment, in order to accommodate the high throughput requirement, the storage system includes a farm or pool of distributed in-memory storage nodes collectively to store content and provide content services to the Web server(s) and the analytics server(s). The pool of the distributed storage nodes, referred to herein as worker or slave storage nodes, may be managed by a master or primary storage node. The number of worker storage nodes in the pool may be configured dependent upon the amount of data to be served and load balancing amongst the worker storage nodes, which may be scaled up and down.

In one embodiment, a master storage node receives a search query from a client for searching content. The client may be a Web server providing content searching services to browsing users or an analytics server providing data analytics services to analytics users. The master storage node manages a number of worker storage nodes over a network (e.g., high-speed Ethernet or storage network). In response to the search query, the master storage node performs a hash operation on one or more keywords of the search query using a predetermined hash function to generate a hash value. The master storage node identifies one of the worker storage node based on the hash value. The master storage nodes redirects the search query or sends another request to the identified worker storage node to allow the worker storage node to service the search query, for example, using data maintained in a system memory of the worker storage node, without having to access its corresponding persistent storage device.

Figure 2:
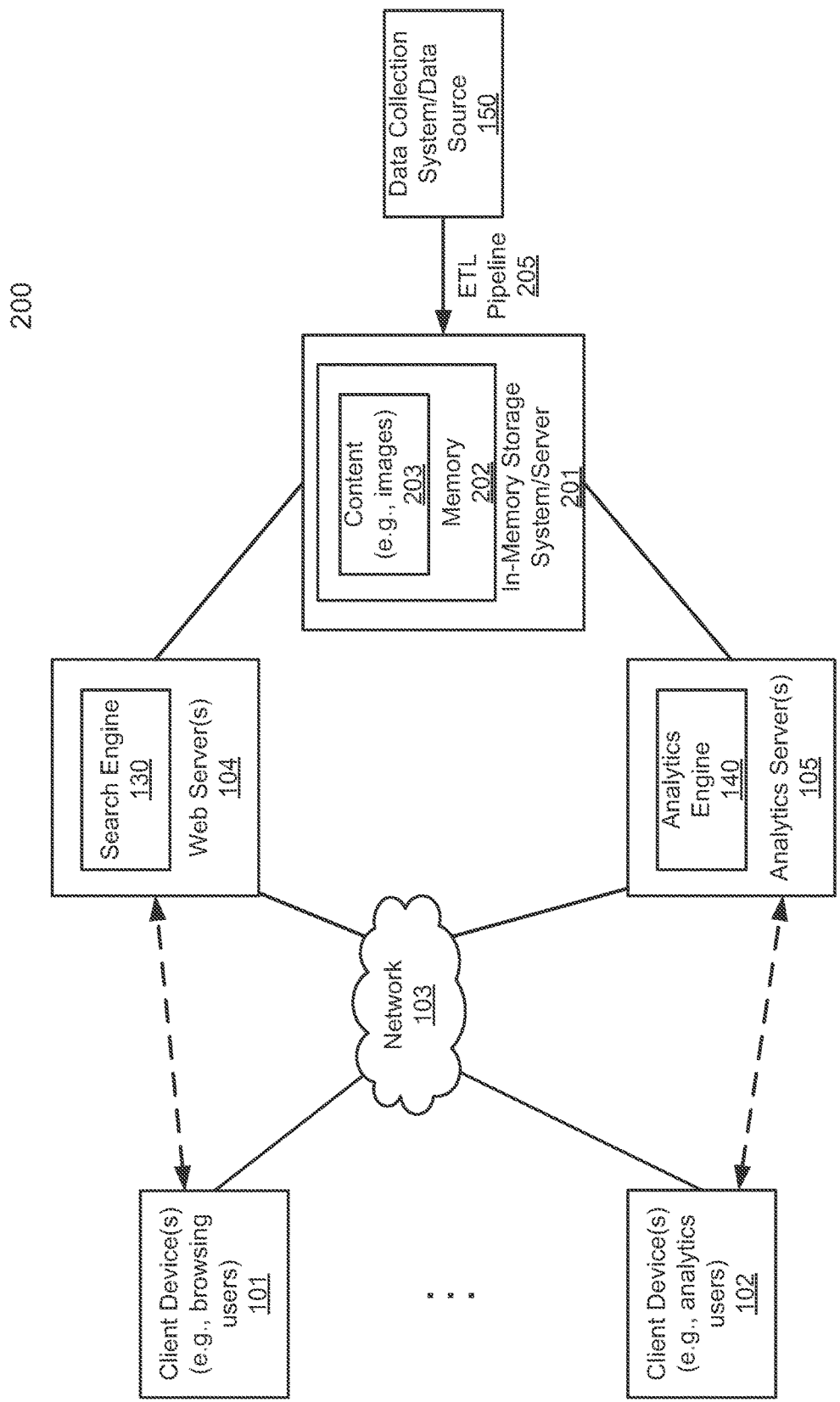
FIG. 2 is a block diagram illustrating a network architecture which may be used as an embodiment of the invention.

FIG. 2 is a block diagram illustrating a network architecture which may be used as an embodiment of the invention. Referring to FIG. 2, similar to system 100 of FIG. 1, client devices 101-102 are communicatively coupled to Web server 104 and analytics server 105 over network 103. Web server 104 includes search engine 130 to provide online content searching to clients 101 (e.g., browsing users) in this example based on content 203 stored in content storage system or server 201. Clients 102 (e.g., analytics users) accesses analytics system or server 105 to perform offline data analyses via analytics engine 140 on content 203 stored on content storage system or server 201.

Client devices 101-102 may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Network 103 may be any type of networks such as a local area network (LAN), a wide area network (WAN) such as the Internet, or a combination thereof, wired or wireless. Servers 104-105 may be any kind of servers or clusters of servers, such as Web or cloud servers, application servers, backend servers, or a combination thereof. Servers 104-105 may each further include an interface (not shown) to allow a client such as client devices 101-102 to access resources or services provided by servers 104-105. The interface may include a Web interface, an application programming interface (API), and/or a command line interface (CLI).

For example, a client, in this example, a user application of client device 101 (e.g., Web browser, mobile application), may send a search query to server 104 and the search query is received by search engine 130 over network 103. In response to the search query, search engine 130 extracts one or more keywords (also referred to as search terms) from the search query. Search engine 130 performs a search in a content database (e.g., data objects 203) hosted by content system or server 201. The content database may include a primary content database and/or an auxiliary content database, to identify a list of content items (e.g., images) that are related to the keywords. The primary content database may be a general content database, while the auxiliary content database (also referred to as a secondary content database) may be a special content or sponsored content database. Search engine 130 returns a search result page having at least some of the content items in the list to the client to be presented therein. Search engine 130 may be a Baidu® search engine available from Baidu, Inc. or alternatively, search engine 130 may represent a Google® search engine, a Microsoft Bing™ search engine, a Yahoo® search engine, or some other search engines.

A search engine, such as a Web search engine, is a software system that is designed to search for information on the World Wide Web. The search results are generally presented in a line of results often referred to as search engine results pages. The information may be a mix of Web pages, images, and other types of files. Some search engines also mine data available in databases or open directories. Unlike web directories, which are maintained only by human editors, search engines also maintain real-time information by running an algorithm on a web crawler.

Web search engines work by storing information about many web pages, which they retrieve from the hypertext markup language (HTML) markup of the pages. These pages are retrieved by a Web crawler, which is an automated Web crawler which follows every link on the site. The search engine then analyzes the contents of each page to determine how it should be indexed (for example, words can be extracted from the titles, page content, headings, or special fields called meta tags). In the field of image searching, image files are indexed based on how the content correlated with the possible search terms. Data about web pages or images are stored in an index database for use in later queries. The index helps find information relating to the query as quickly as possible.

When a user enters a query into a search engine (typically by using keywords), the engine examines its index and provides a listing of best-matching web pages or images according to its criteria, usually with a short summary containing the document's title and sometimes parts of the text. Alternatively, it contains images' content and its original universal resource locator (URL) in shortened form. The index is built from the information stored with the data and the method by which the information is indexed. The search engine looks for the words or phrases exactly as entered. Some search engines provide an advanced feature called proximity search, which allows users to define the distance between keywords. There is also concept-based searching where the research involves using statistical analysis on pages containing the words or phrases you search for. As well, natural language queries allow the user to type a question in the same form one would ask it to a human.

The usefulness of a search engine depends on the relevance of the result set it gives back. While there may be millions of web pages that include a particular word or phrase, some pages may be more relevant, popular, or authoritative than others. Most search engines employ methods to rank the results to provide the "best" results first. How a search engine decides which pages are the best matches, and what order the results should be shown in, varies widely from one engine to another.

The content (e.g., data objects 203 such as images) may be provided by data collection system or server 150, where the content may be collected from one or more content providers (e.g., Web sites), for example, using a number of network crawlers (not shown). Network crawlers or Web crawlers are programs that automatically traverse the network's hypertext structure. In practice, the network crawlers may run on separate computers or servers, each of which is configured to execute one or more processes or threads that download documents from URLs. The network crawlers receive the assigned URLs and download the documents at those URLs. The network crawlers may also retrieve documents that are referenced by the retrieved documents to be processed by a content processing system (not shown) and/or search engine 130. Network crawlers can use various protocols to download pages associated with URLs, such as hypertext transport protocol (HTTP) and file transfer protocol (FTP).

In addition, according to one embodiment, data objects 203 (e.g., images) may also be analyzed by analytics engine 140 of analytics system or server 105. For example, analytics users (represented by clients 102) may access analytics server 105 over network 103 to invoke analytics engine 140 to perform analyses on data objects 203. For the purpose of illustrations, server 104 and content storage system/server 201 are collectively referred to as an online searching system, while server 105 and content storage system/server 201 are collectively referred to as an offline analytics system. As described above, the online searching system requires a low latency capability, because the content has to be searched and returned in a very short period of time in response to a search query. The offline analytics system requires a high throughput capability, because a large amount of data will be accessed.

According to one embodiment, in order to satisfy the low latency and high throughput requirements, content storage system/server 201 is implemented as an in-memory storage system, where substantially all content to be served are loaded into a system memory all the time during the operations of storage system 201. Thus, in response to a request, either from online searching server 104 or offline analytics server 105, the content being requested can be directly identified and retrieved from content 203 maintained in memory 202 to service the request, without having to access a persistent storage device (not shown) of content storage system 201, which may require longer time (e.g., seek time). Such an in-memory configuration can satisfy both the low latency and high throughput requirements. Furthermore, since content storage system 201 is shared by both servers 104-105, data collection system or data source 150 only needs to establish a single ETL pipeline 205 to provide the data to be stored in content storage system 201, where a conventional system as shown in FIG. 1 requires at least two ETL pipelines.

ETL refers to a process in database usage and especially in data warehousing that extracts data from homogeneous or heterogeneous data sources, transforms the data for storing it in the proper format or structure for the purposes of querying and analysis, and loads it into the final target (database, more specifically, operational data store, data mart, or data warehouse). Usually all the three phases execute in parallel since the data extraction takes time, so while the data is being pulled another transformation process executes, processing the already received data and prepares the data for loading and as soon as there is some data ready to be loaded into the target, the data loading kicks off without waiting for the completion of the previous phases.

FIG. 3A is a block diagram illustrating an example of an in-memory storage system according to one embodiment of the invention. System 300 may be implemented as part of system 200 of FIG. 2. Referring to FIG. 3A, in this example, in-memory storage system/server 301 may be implemented as part of storage system 201 of FIG. 2. In one embodiment, storage system 301 includes memory 303 and persistent storage system 302, as well as other processing resources such as a processor, a network interface, etc (not shown).

Memory 303 can be any kind of volatile or non-volatile random access memory (RAM) devices. Persistent storage device 302 can be any kind of non-volatile storage device such as a hard disk. Persistent storage device 302 stores all of the data objects 305 representing the content (e.g., images) to be served to clients such as search engine 130 of Web server 104 and/or analytics engine 140 of analytics server 105.

In one embodiment, substantially all of the data objects 305 are loaded and maintained in memory 303 as part of data objects 311-313 at all time during the operations of storage system 301. During the initialization (e.g., boot time) of storage system 301, substantially all of the data objects 305 are loaded into memory 303 and remain therein throughout the operations of storage system 301. In one embodiment, additional images can also be loaded into the memory after the initialization when the new images become available and its image store is also updated. Storage service module 304 is to provide storage services to clients over network 310 using a variety of accessing methods or file system protocols. Network 310 can be a high speed network such as a high speed Ethernet or storage network. In addition, storage system 301 further maintains an object store 315 as an index to provide a high speed searching for data objects 311-313.

In one embodiment, in response to a search request from a client, in this example, servers 104-105, storage service module 304 performs a lookup operation in object store 315 based on the request to identify a list of one or more of data objects 311-313. In one embodiment, object store 315 is a key-value (KV) store, in which object store 315 includes a number of entries, each mapping a particular key to a value or values representing a list of one or more data objects or object IDs identifying the data objects. A key herein may refer to a hash value that represents certain characteristics of a search query (e.g., one or more keywords). When a search query is received, storage service module 304 performs a hash operation on at least a portion the search query (e.g., one or more keywords of the search query) using a predetermined hash function to generate a hash value. The hash value is then utilized as a key to look up in object store 315 to identify a list of data objects.

The identified data objects can then be directly retrieved from memory 303 and returned to the client, without having to access persistent storage device 302 for the same, which takes a longer time (e.g., longer seek time). By maintaining substantially all of the data objects in memory 303 during the operations, both the low latency and high throughput can be satisfied. In order to further provide services to satisfy an even higher throughput requirement, storage system 301 may be implemented in a distributed storage system as shown in FIG. 3B.

Figure 3B:
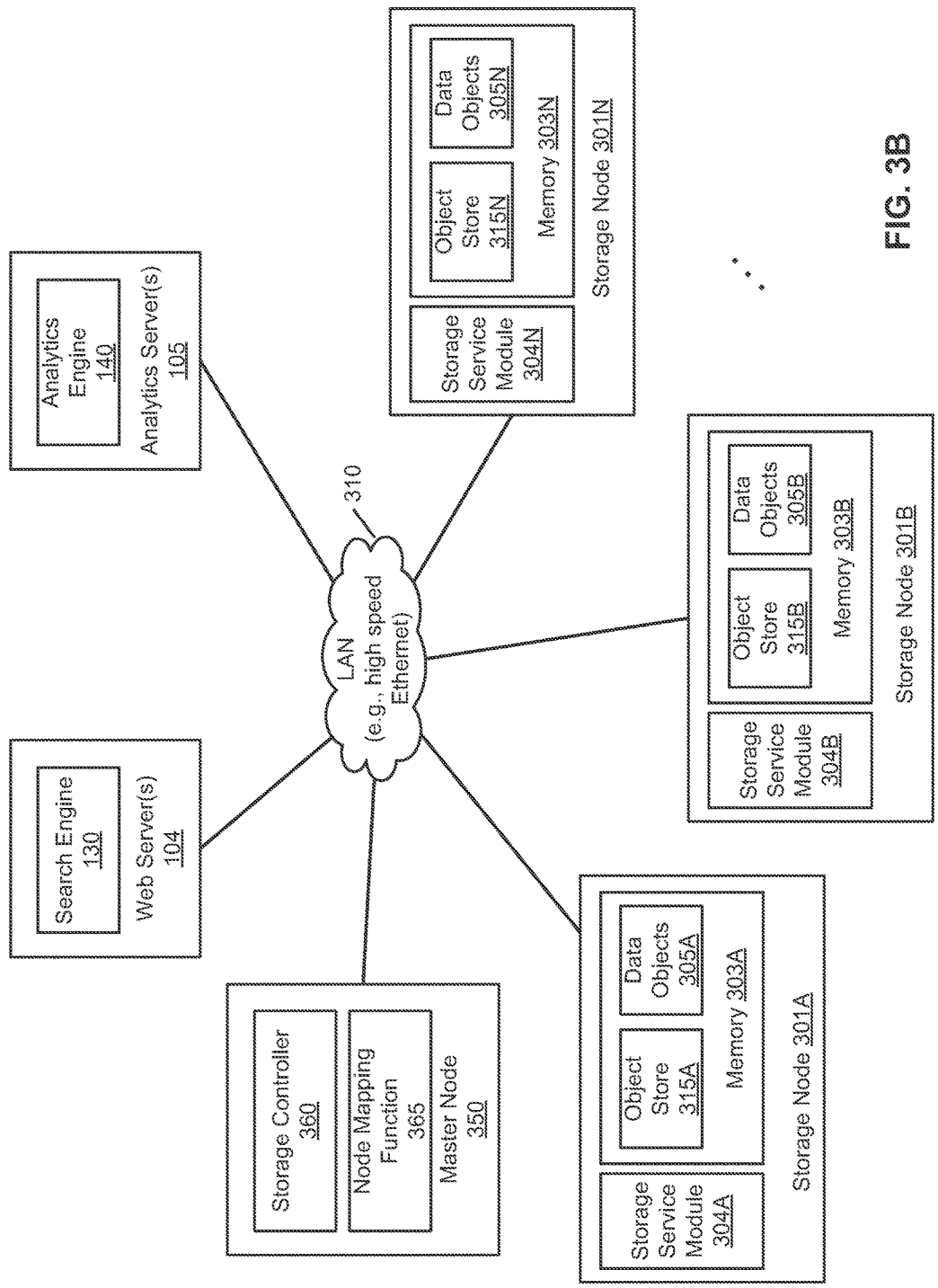

Referring now to FIG. 3B, a distributed storage system includes a number of distributed storage nodes 301A-301N, each of which being an in-memory storage node (referred to herein as a worker storage node or a slave storage node) managed by master node 350 (also referred to as a primary storage node). Similar to storage system 301 of FIG. 3A, each of storage nodes 301A-301N maintains substantially all of the data objects stored therein in its system memory (e.g., data objects 302A-302N stored in memories 303A-303N respectively). Each of storage nodes 301A-301N further includes a storage service module or logic and an object store (e.g., storage service modules 304A-304N and object stores 315A-315N), respectively as described above with respect to storage system 301 of FIG. 3A. An object store of each storage node stores information identifying the data objects stored therein, which may be a KV object store as described above.

Master node 350 may have a similar architecture with respect to storage nodes 301A-301N, but is selected as a master storage node. In one embodiment, master node 350 includes storage controller 360 to manage storage nodes 301A-301N based on node information stored in node mapping function 365. Node mapping function 365 may be implemented in a variety of functions and/or data structures, such as, for example, a hash function, a node mapping table, etc. Node mapping function 365 may be referred to as a node registry to register each of storage nodes 301A-301N, where node mapping function 365 is utilized to determine which of storage nodes 301A-301N to service a particular request received from servers 104-105.

In one embodiment, when a request for searching content (e.g., images) is received from a client (e.g., servers 104-105), storage controller 360 examines the request and invokes node mapping function 365 to determine one or more of storage nodes 301A-301N based on the request. Storage controller 360 then forwards the request or sends another request to the determined storage node to allow the storage node to identify one or more data objects based on the request, to retrieve the identified data objects from its memory, and to return the data objects as a search result to the client, all of which without having to access a persistent storage device of the storage node for the same data objects. In one embodiment, the data objects stored across the storage nodes may be non-duplicated data objects.

Node that the distributed storage nodes 301A-301N can be easily scaled up and down dependent upon the workload (e.g., storage space requirement) and bandwidth (e.g., load balance). An administrator can add an additional storage node into the pool by registering the new storage node to node mapping function 365. Similarly, a storage node can also be removed from the pool by deregistering it from node mapping function 365. Also note that master node 350 may also maintain its own object store representing data objects stored in its memory. Thus, master node 350 may provide storage services to data objects, as well as managing other storage nodes. When a search request is received, the node mapping function may map that request to master node 350.

Figure 4:
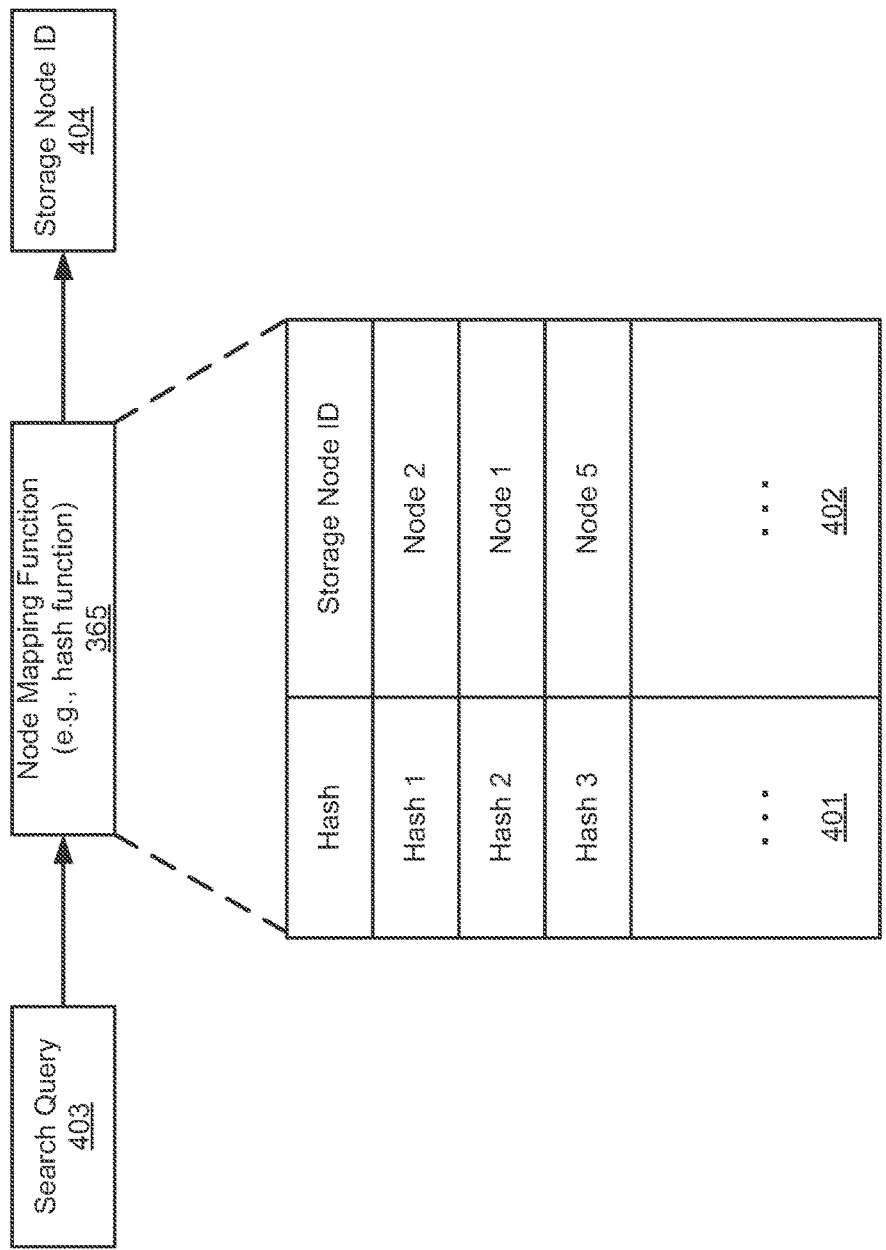
FIG. 4 is a block diagram illustrating an example of a node mapping function according to one embodiment of the invention.

FIG. 4 is a block diagram illustrating an example of a node mapping function according to one embodiment of the invention. Referring to FIG. 4, in one embodiment, node mapping function 365, in this example, as a mapping table for the purpose of illustration only, includes a number of mapping entries. Each mapping entry maps a particular hash value 401 to a storage node ID 402 that identifies one of the storage nodes (e.g., storage nodes 301A-301N) associated with a distributed storage system. When a search query or request 403 is received, a storage controller of a master node (e.g., controller 360 of master node 350 of FIG. 3B) performs a hash operation on at least a portion of the request 403 (e.g., one or more keywords) using a predetermined hash function to generate a hash value. Based on the hash value, a lookup operation is performed in node mapping table 365 to derive a storage node ID 404. One of the storage nodes in the pool is then selected based on the storage node ID 404 to serve the request. Note that the predetermined hash function can be implemented as part of node mapping function 365, which may directly generate storage node ID 404 based on search request 403.

Figure 5:
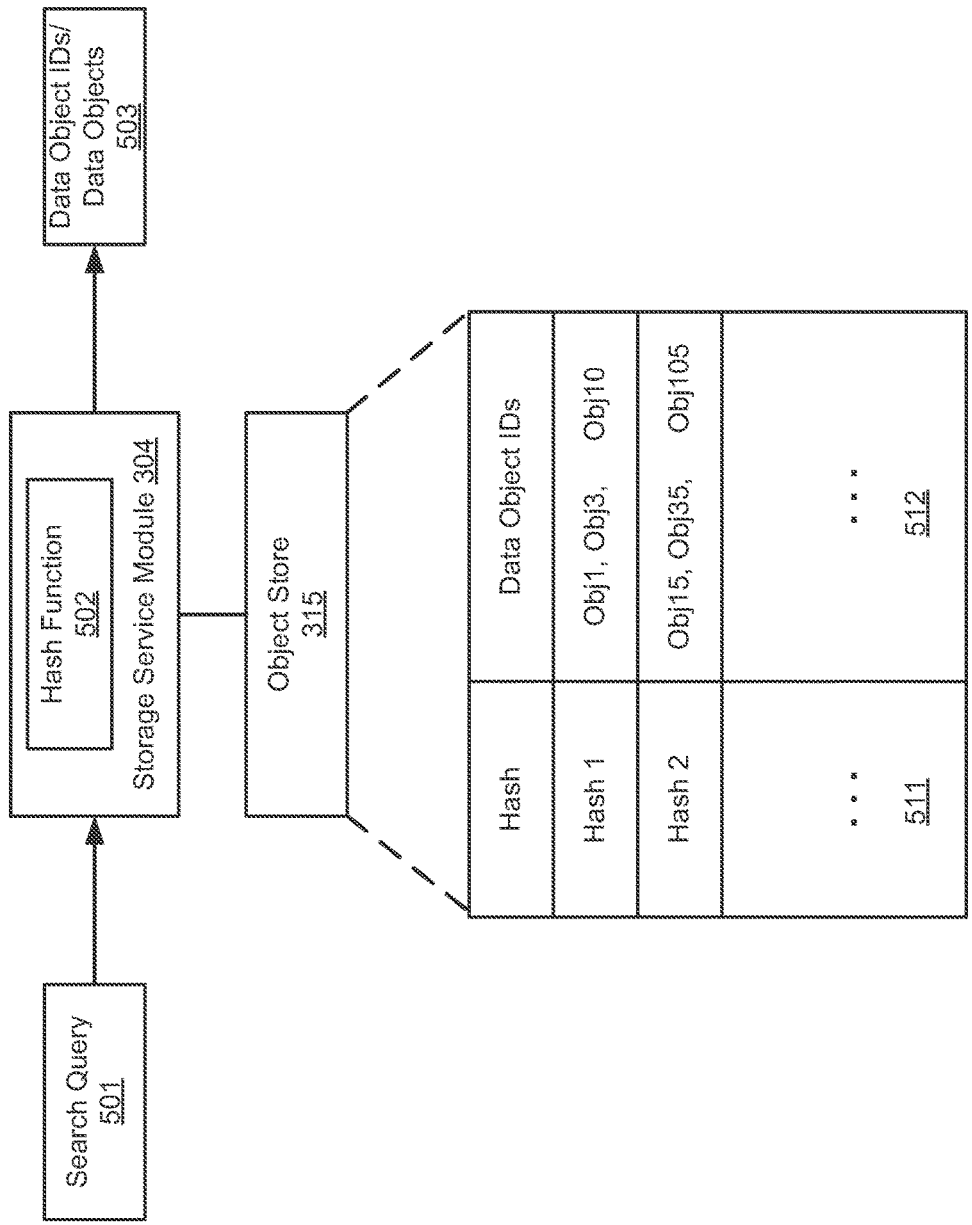
FIG. 5 is a block diagram illustrating an example of an object store according to one embodiment of the invention.

FIG. 5 is a block diagram illustrating an example of an object store according to one embodiment of the invention. Object store 315 may be implemented as part of the object stores described above in FIGS. 3A-3B. Referring to FIG. 5, in one embodiment, for the purpose of illustration only, object store 315 is implemented as a KV store. In particular, object store 315 includes a number of entries, each entry mapping a key to a value representing a list of one or more data objects. In this example, each mapping entry maps a hash value 511 to one or more data object IDs 512 that identify one or more data objects. When a search request 501 is received, for example, from servers 104-105, storage service module 304 performs a hash operation on at least a portion of search request 501 (e.g., one or more keywords of the request) to generate a hash value. A lookup operation is performed, for example, by a lookup module, in object store 315 based on the hash value to determine a list of data object IDs 503. The data objects are then identified, retrieved, and returned to the client directly from the memory of the corresponding storage node without having to access a persistent storage device.

Figure 6:
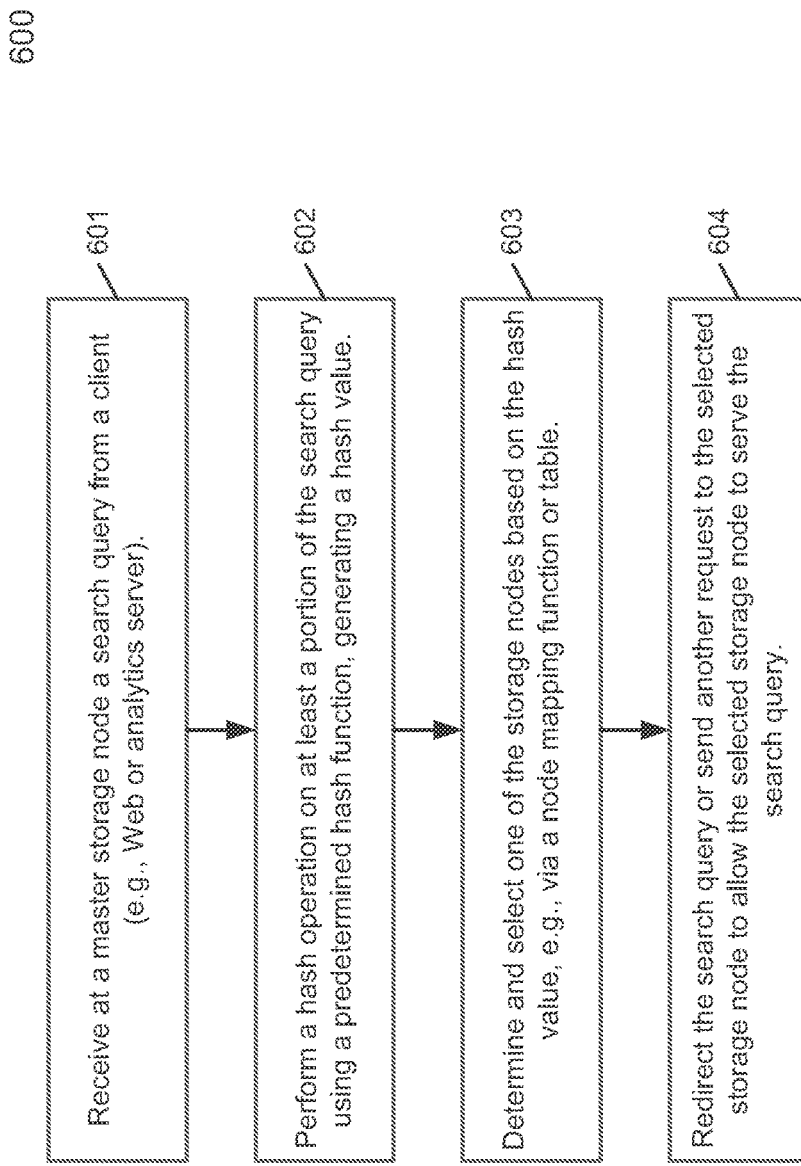
FIG. 6 is a flow diagram illustrating a process for searching content according to one embodiment of the invention.

FIG. 6 is a flow diagram illustrating a process for searching content according to one embodiment of the invention. Process 600 may be performed by processing logic which may include software, hardware, or a combination thereof. For example, process 600 may be performed by master node 350 of FIG. 3A. Referring to FIG. 6, at block 601, processing logic receives a search query from a client (e.g., Web server, analytics server) for searching data objects. In response to the search query, at block 602, processing logic performs a hash operation on at least a portion of the search query using a predetermined hash function or hash algorithm, generating a hash value. At block 603, processing logic determines one of the storage nodes in a pool (e.g., worker storage nodes or slave storage nodes) based on the hash value. For example, processing logic may perform a lookup operation in a node mapping table based on the hash value to identify a storage node. At block 604, processing logic redirects the search query or sends another request to the determined storage node to allow the storage node to serve the search query. The storage node then provides storage services to the client by identifying, retrieving, and returning data objects to the client directly from its memory without having to access a persistent storage device of the storage node.

Figure 7:
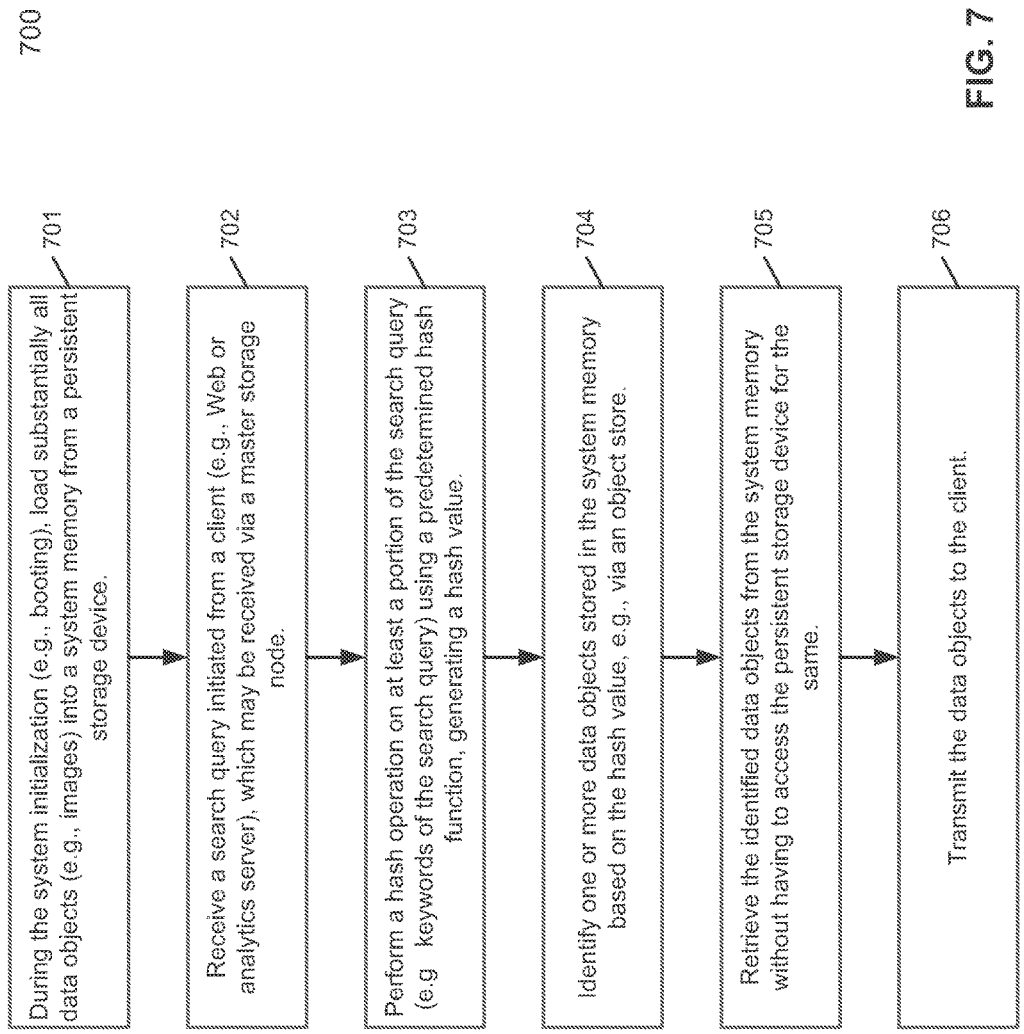
FIG. 7 is a flow diagram illustrating a process for searching content according to one embodiment of the invention.

FIG. 7 is a flow diagram illustrating a process for searching content according to one embodiment of the invention. Process 700 may be performed by processing logic which may include software, hardware, or a combination thereof. For example, process 700 may be performed by a storage node (e.g., either master node or one of the worker storage nodes). Referring to FIG. 7, at block 701, during the initialization (e.g., booting), processing logic loads substantially all data objects (e.g., images) from a persistent storage device into a system memory of a storage node, as well as an object store representing or indexing the data objects. In one embodiment, additional images can be loaded into system memory after initialization. Once the loading is once, the master node has the information about the new data, so that queries can be routed to these new contents. At block 702, processing logic receives a search query initiated from a client (e.g., Web server, analytics server). In response to the search query, at block 703, processing logic performs a hash operation on at least a portion of the search query using a predetermined hash function, generating a hash value. At block 704, processing logic looks up in an object store based on the hash value to identify one or more data object IDs identifying one or more data objects. At block 705, processing logic retrieves the data objects directly from a system memory without having to access a persistent storage device for the same. At block 706, the data objects are returned to the client as part of a search result.

Note that some or all of the components as shown and described above (e.g., storage controller, storage service module, etc.) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
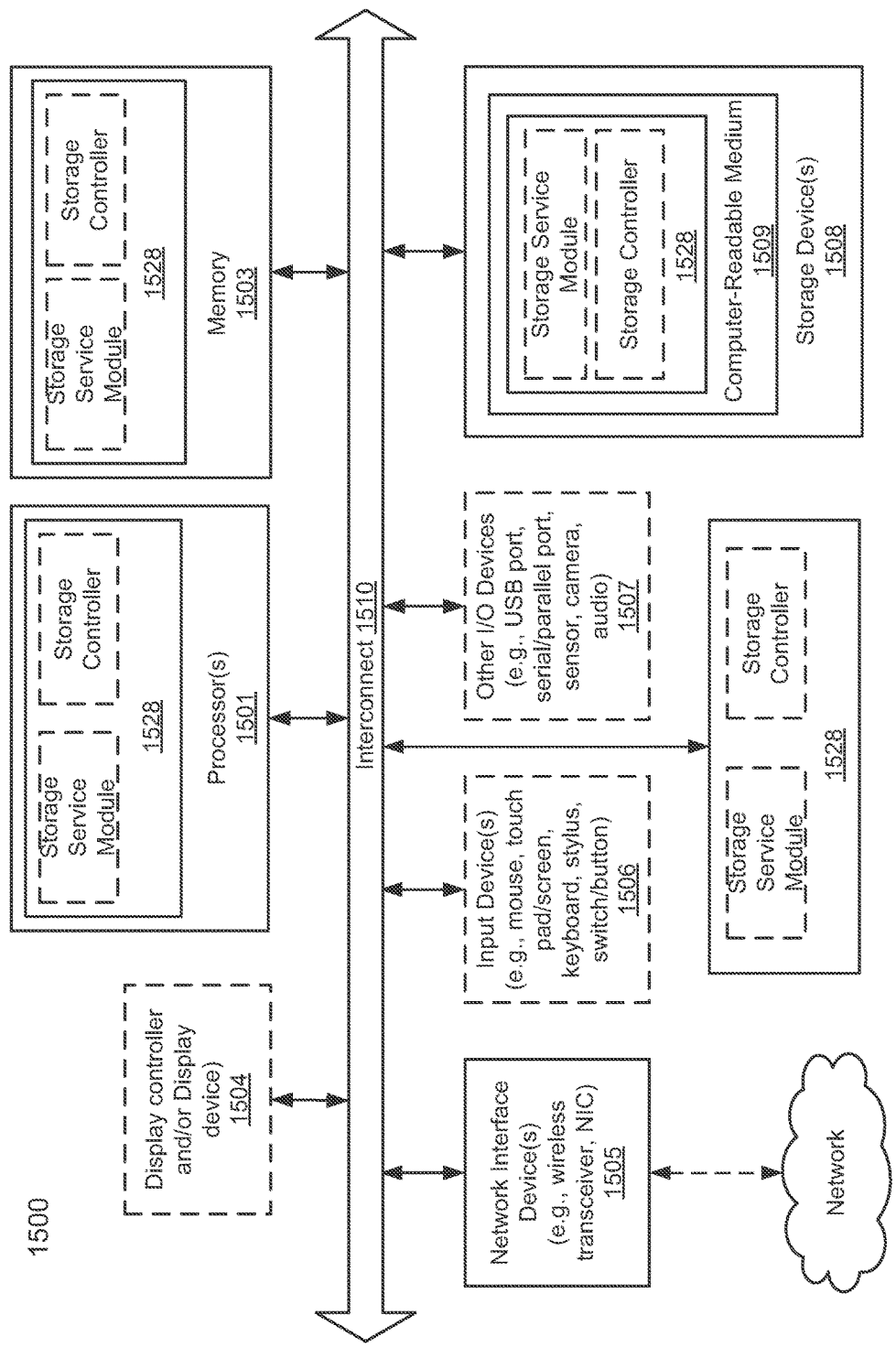
FIG. 8 is a block diagram illustrating a data processing system according to one embodiment.

FIG. 8 is a block diagram illustrating an example of a data processing system which may be used with one embodiment of the invention. For example, system 1500 may represents any of data processing systems described above performing any of the processes or methods described above, such as, for example, a master node, a worker storage node, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, a graphics processing unit (GPU), or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may represent any of the components described above, such as, for example, a search engine, an encoder, an interaction logging module as described above. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for searching images, the method comprising:
   receiving at one or more processors of a master storage node a search query for searching images from a first client, the master storage node being coupled to a plurality of worker storage nodes over a storage network;
   performing by the one or more processors of the master storage node a hash operation on one or more keywords of the search query using a first predetermined hash function to generate a first hash value;
   identifying by the one or more processors of master storage node a first of the worker storage nodes based on the first hash value;
   receiving a data analytics service request from a second client, wherein the data analytics service request is to be processed by the one or more processors of the master storage node offline, and
   redirecting by the one or more processors of the master storage node the search query and the data analytics services request from the second client, to the first worker storage node to allow the first worker storage node to service the search query and the data analytics services request concurrently, wherein the first worker storage node;
      identifies one or more first images from a first system memory of the first worker storage node based on the search query;
      transmits the one or more first images to the first client;
      identifies one or more second images from the first system memory of the first worker storage node for the data analytics services request,
         wherein the identifying the one or more first images and the one or more second images occurs concurrently; and
      transmits a data analytics result based on the one or more second images to the second client.

2. The method of claim 1, wherein each of the worker storage nodes is an in-memory storage node that stores substantially all images to be served in a system memory of the worker storage node during operations of the worker storage node.

3. The method of claim 1, wherein the first client is a Web server that provides Web image searching services to browsing users and the second client is an analytics server that provides image analytics services to analytics users.

4. The method of claim 3, wherein images stored in the worker storage nodes are non-duplicated images that are used by the Web server and the analytics server to provide image browsing services and image analytics services to the browsing users and analytics users, respectively.

5. The method of claim 1, wherein identifying a first of the worker storage nodes based on the first hash value comprises:
   performing a lookup operation in a storage node mapping table based on the first hash value to locate a first mapping entry matching the first hash value; and
   obtaining a first storage node identifier (ID) identifying the first worker storage node from the matching entry, wherein the storage node mapping table includes a plurality of mapping entries, each mapping a hash value to a storage node ID.

6. The method of claim 1, wherein, in response to the search query, the first worker storage node is to retrieve the one or more first images directly from the first system memory and to return the one or more first images to the first client, without having to retrieve the one or more first images from a persistent storage device associated with the first worker storage node.

7. The method of claim 1, wherein, in response to the search query, the first worker storage node is to
   perform a hash operation on the search query using a second predetermined hash function, generating a second hash value, and
   determine the one or more first images based on the second hash value.

8. The method of claim 7, wherein the first worker storage node is further to
   perform a lookup operation in an image store index based on the second hash value to determine one or more image identifiers (IDs) identifying the one or more first images, and
   retrieve the one or more first images based on the image IDs from the first system memory.

9. A non-transitory machine-readable medium having instructions stored therein, which when executed by a processor, cause the processor to perform operations of searching images, the operations comprising:
   receiving by one or more processors of a master storage node a search query for searching images from a client, the master storage node being coupled to a plurality of worker storage nodes over a storage network;
   performing by the one or more processors of the master storage node a hash operation on one or more keywords of the search query using a first predetermined hash function to generate a first hash value;
   identifying by the one or more processors of master storage node a first of the worker storage nodes based on the first hash value;
   receiving a data analytics service request from a second client, wherein the data analytics service request is to be processed by the one or more processors of the master storage node offline; and
   redirecting by the one or more processors of the master storage node the search query and the data analytics services request from the second client, to the first worker storage node to allow the first worker storage node to service the search query and the data analytics services request concurrently, wherein the first worker storage node;
      identifies one or more first images from a first system memory of the first worker storage node based on the search query;
      transmits the one or more first images to the first client;
      identifies one or more second images from the first system memory of the first worker storage node for the data analytics services request, wherein the identifying the one or more first images and the one or more second images occurs concurrently; and
      transmits a data analytics result based on the one or more second images to the second client.

10. The non-transitory machine-readable medium of claim 9, wherein each of the worker storage nodes is an in-memory storage node that stores substantially all images to be served in a system memory of the worker storage node during operations of the worker storage node.

11. The non-transitory machine-readable medium of claim 9, wherein the first client is a Web server that provides Web image searching services to browsing users and the second client is an analytics server that provides image analytics services to analytics users.

12. The non-transitory machine-readable medium of claim 11, wherein images stored in the worker storage nodes are non-duplicated images that are used by the Web server and the analytics server to provide image browsing services and image analytics services to the browsing users and analytics users, respectively.

13. The non-transitory machine-readable medium of claim 9, wherein identifying a first of the worker storage nodes based on the first hash value comprises:
performing a lookup operation in a storage node mapping table based on the first hash value to locate a first mapping entry matching the first hash value; and
obtaining a first storage node identifier (ID) identifying the first worker storage node from the matching entry, wherein the storage node mapping table includes a plurality of mapping entries, each mapping a hash value to a storage node ID.

14. The non-transitory machine-readable medium of claim 9, wherein, in response to the search query, the first worker storage node is to retrieve the one or more first images directly from the first system memory and to return the one or more first images to the first client, without having to retrieve the one or more first images from a persistent storage device associated with the first worker storage node.

15. The non-transitory machine-readable medium of claim 9, wherein, in response to the search query, the first worker storage node is to
perform a hash operation on the search query using a second predetermined hash function, generating a second hash value, and
determine the one or more first images based on the second hash value.

16. The non-transitory machine-readable medium of claim 15, wherein the first worker storage node is further to
perform a lookup operation in an image store index based on the second hash value to determine one or more image identifiers (IDs) identifying the one or more first images, and
retrieve the one or more first images based on the image IDs from the first system memory.

17. A data processing system operating as a master storage node, the system comprising:
one or more processors;
a memory coupled to the one or more processors for storing instructions, which when executed by the one or more processors, cause the one or more processors to perform operations of search images, the operations including
receiving by the one or more processors a search query for searching images from a client, the master storage node being coupled to a plurality of worker storage nodes over a storage network,
performing by the one or more processors a hash operation on one or more keywords of the search query using a first predetermined hash function to generate a first hash value,
identifying by the one or more processors a first of the worker storage nodes based on the first hash value;
receiving a data analytics service request from a second client, wherein the data analytics service request is to be processed by the one or more processors of the master storage node offline; and
redirecting by the one or more processors the search query and the data analytics services request from the second client, to the first worker storage node to allow the first worker storage node service the search query and the data analytics services request concurrently, wherein the first worker storage node:
identifies one or more first images from a first system memory of the first worker storage node based on the search query;
transmits the one or more images to the first client;
identifies one or more second images from the first system memory of the first worker storage node for the data analytics services request, wherein the identifying the one or more first images and the one or more second images occurs concurrently; and
transmits a data analytics result based on the one or more second images to the second client.

18. The system of claim 17, wherein each of the worker storage nodes is an in-memory storage node that stores substantially all images to be served in a system memory of the worker storage node during operations of the worker storage node.

19. The system of claim 17, wherein the first client is a Web server that provides Web image searching services to browsing users and the second client is an analytics server that provides image analytics services to analytics users.

20. The system of claim 19, wherein images stored in the worker storage nodes are non-duplicated images that are used by the Web server and the analytics server to provide image browsing services and image analytics services to the browsing users and analytics users, respectively.

21. The system of claim 17, wherein identifying a first of the worker storage nodes based on the first hash value comprises:
performing a lookup operation in a storage node mapping table based on the first hash value to locate a first mapping entry matching the first hash value; and
obtaining a first storage node identifier (ID) identifying the first worker storage node from the matching entry, wherein the storage node mapping table includes a plurality of mapping entries, each mapping a hash value to a storage node ID.

22. The system of claim 17, wherein, in response to the search query, the first worker storage node is to retrieve the one or more first images directly from the first system memory and to return the one or more first images to the first client, without having to retrieve the one or more first images from a persistent storage device associated with the first worker storage node.

23. The system of claim 17, wherein, in response to the search query, the first worker storage node is to
perform a hash operation on the search query using a second predetermined hash function, generating a second hash value, and
determine the one or more first images based on the second hash value.

24. The system of claim 23, wherein the first worker storage node is further to
perform a lookup operation in an image store index based on the second hash value to determine one or more image identifiers (IDs) identifying the one or more first images, and
retrieve the one or more first images based on the image IDs from the first system memory.

* * * * *